Dec. 10, 1957 C. B. FORREST ET AL 2,816,226

COUNTER CIRCUIT

Original Filed Feb. 21, 1952

Cameron B. Forrest,
Sidney S. Green,
*INVENTORS.*

*BY* Edwin A. Oser

*AGENT.*

United States Patent Office 2,816,226

Patented Dec. 10, 1957

2,816,226

COUNTER CIRCUIT

Cameron B. Forrest, Los Angeles, Calif., and Sidney S. Green, Minneapolis, Minn., assignors, by mesne assignments, to Hughes Aircraft Company, a corporation of Delaware Original application February 21, 1952, Serial No. 272,784. Divided and this application December 31, 1956, Serial No. 631,966

7 Claims. (Cl. 250—27)

This invention relates generally to digital counter circuits and more particularly to digital counter circuits which are capable of counting up or counting down in dependence of certain control stimuli applied thereto.

This application is a division of a copending application of the applicants, Serial No. 272,784, filed February 21, 1952, entitled "Analog-to-Digital Converter."

Several types of counter circuits are used in digital systems. A fundamental type of counter is the conventional electronic flip-flop which has two stable electrical states. A circuit of this type may comprise a pair of triodes connected in parallel across a supply of voltage and having their grids and plates cross-connected so that the plate voltage of one tube controls the grid voltage of the other. According to one method of control, the application of pulses of sufficiently negative potential to the common cathodes of these tubes drives the cathode of the non-conducting tube negative with respect to its grid in an amount to initiate tube conduction. Due to the cross connection of the grids and plates the grid potential of the tube which has been conducting is lowered, reducing its conduction which in turn increases the grid voltage of the tube just starting to conduct, quickly reversing the circuit to its other stable electrical state. The circuit may be switched between its two stable electrical states by repeated application of the negative pulses to the common input circuit, in this case, the common cathodes, and in this sense in the elementary form described, affords a means for determining whether an odd or an even number of negative pulses has been applied with reference to the initial conducting state of the circuit.

The application of this fundamental flip-flop in a circuit for counting input pulses again with a single input is effected by cascading a plurality of the aforesaid flip-flop circuits in a counting chain with carry circuits from each lower order binary flip-flop to the next higher order binary flip-flop to form the counting chain. The stable electrical states of such a circuit increase exponentially with the number of flip-flops, thus three flip-flops in a counting chain will provide a counter having $2^3$ or eight stable electrical states.

For binary counting purposes the carry circuits referred to above may include a pair of parallel connected trigger tubes normally biased to cut off and adapted to simultaneously conduct upon the application of a positive pulse to their common control grids. The respective plate circuits of the trigger tubes are connected to the corresponding grid and plate circuits of the tubes of the flip-flop. This represents another way of controlling the flip-flops with a single input as compared with that previously mentioned where the single input was represented in the common cathode connection. Thus, conduction of the trigger tubes causes the grids and plates of the tubes of the flip-flop to take a negative swing. This has no effect on the non-conducting flip-flop tube but acts to cut off the conducting tube. The rise in plate voltage of the flip-flop tube being cut off drives the grid of the other flip-flop tube positively initiating conduction which causes the flip-flop circuit to reverse its electrical state.

If corresponding tubes of the respective flip-flops are initially conducting and if each initially non-conducting tube plate circuit is coupled into the single input of the trigger circuit of the next higher order stage and, further, if the assumed initial conducting state of each flip-flop represents its binary "0" electrical state, a counting circuit for counting input pulses applied in the first stage is obtained wherein the first stage reverses its electrical state with the application of a first pulse to represent a binary "1." The application of a second pulse reverses the electrical state of the first stage to its binary "0" electrical state cutting off the normally conducting tube in the binary "1" electrical state of the first stage and transmitting a positive pulse to the single input of the next higher order stage trigger circuit causing the flip-flop of this next higher order stage to change from its binary "0" electrical state to its binary "1" electrical state, etc. Thus, returning to the initial assumption and following through the two pulse applications as described, the binary significance of the successive electrical states of a three-stage counter chain is represented by the successive binary notations 000, 001, 010.

The counter which has been described is capable of counting up only. If it is desired to count down with such a counter additional circuits are required connecting the plates of the respective flip-flop tubes of each stage to the next higher order stage and providing isolation and selective control of pulse transmission from the respective plates into the trigger circuits of the next higher stage to effect selective control of the counting up or counting down operation.

Prior art arrangements available for such two-way counting operation are relatively complicated and usually require pairs of gating circuits between the respective stages together with suitable external control of the respective gates of the pairs in order to achieve the function of counting in both directions.

Accordingly, one object of this invention is to provide an improved and simplified digital type of counting circuit.

Another object of this invention is to provide a simplified digital type of counting circuit which is capable of selectively counting up or counting down.

A further object of this invention is to provide a two-way digital counting circuit which is selectively controllable for counting up or counting down and which utilizes a minimum number of electrical components in achieving this operation.

More particularly stated, it is an object of this invention to provide a flip-flop type of digital counter circuit wherein selective operation in counting up or counting down is achievable through the selective application of voltages directly to all of the counter stages.

According to a presently preferred embodiment of this invention, the circuit simplification and the advantages inhering therein referred to above may be realized in a flip-flop type of counting chain through common connections of the grid circuits of each higher order of the flip-flop stage to the plate circuits of each of the tubes of the next lower order flip-flop stage and so on throughout the chain. Each plate circuit is provided with an impedance connected in series therein which is polarized to transmit a pulse of the proper sense to the next higher order stage. Selective transmission of pulses of the selected sense from one stage to the next is controlled through the simultaneous application of clamping voltages to corresponding flip-flop tube plate circuits throughout the counting chain. Thus, for example, to count up a clamping voltage would be applied to one set of corresponding plate circuits whereupon the application of count pulses to the common grid circuits of the flip-flop tubes of the first stage provides effective transmission of pulses of the required sense from the plate circuit of each unclamped plate circuit to the common grids of the next higher order flip-flop stage. To count down the clamping voltage is removed from the first-named set of corresponding plate circuits and applied to the remaining corresponding plate circuits of all of the stages. Thus, the count pulses applied to the common grid circuits of the first stage of the counter chain reverse the counter operation so that the count-down operation referred to is obtained.

The above-mentioned and other features and objects of this invention and the manner of obtaining them will become more apparent by reference to the following description taken in conjunction with the accompanying drawings wherein.

Figure 1:
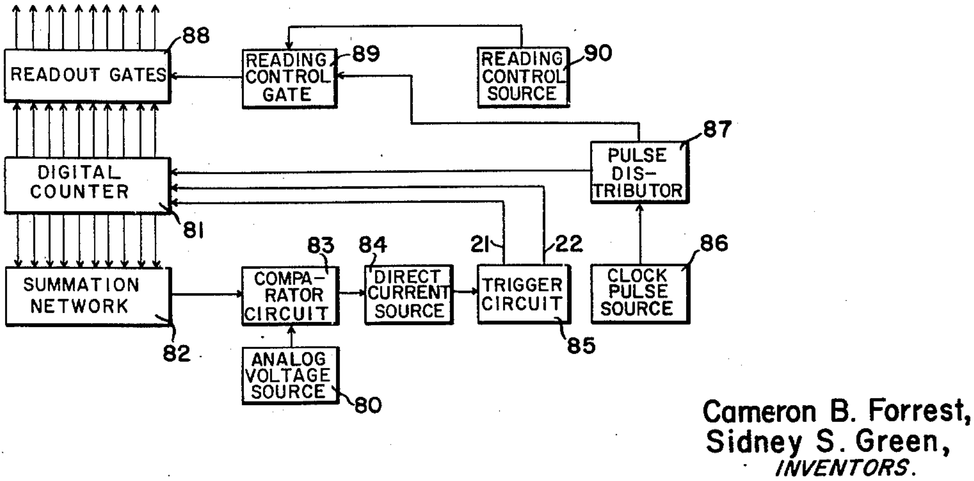
Fig. 1 is a diagrammatical illustration of a counter circuit embodying the principles of this invention.

The invention is embodied in a three-stage counter illustrated in Fig. 1. This counter comprises respective electronic bistable stages designated I, II, III, proceeding from the least significant to the most significant stage. Obviously, this configuration may be extended to include any number of stages following the pattern indicated. Since all of the stages are the same, only stage I, the least significant stage, is illustrated in detail with respect to its bistable electronic arrangement. The other bistable electronic circuits are indicated in block form showing only the external connections which are made thereto.

A conventional bistable electronic flip-flop type of circuit has been selected for illustrating this invention. This circuit, referring to stage I of Fig. 1, embodies a twin triode generally designated 1, having respective tube sections, A and B, in a single envelope, each section conventionally comprising a plate, a cathode and a control grid. The plates and grids of the twin triode 1 are conventionally connected between corresponding voltage points on respective voltage divider networks connected in parallel between a supply of voltage represented in a conductor designated B+ and a second conductor designated C—. One of these circuits includes in series a peaking inductor 2, a plate voltage resistor 3 and resistors 4 and 5; the other voltage divider circuit includes in series a peaking inductor 6, a plate resistor 7 and resistors 8 and 9. The cathodes of both tube sections A and B are grounded to complete the tube circuits. In this circuit, resistors 5 and 9, respectively, establish predetermined levels of grid bias for the respective sections of the tube. The grids are simultaneously controlled from a count pulse source (not shown in Fig. 1) through a capacitor 10, in parallel circuits including respective diodes 11 and 12 which are poled in a sense to apply only negative voltage pulses simultaneously to the respective grids. A resistor 14 connects the grid circuit side of capacitor 10 to a conductor generally designated E+, providing a positive bias at this point in the common grid circuits. The magnitude of the supply of E+ voltage is chosen to prevent inadvertent triggering of the twin triode 1, owing to noise pulses but to permit triggering by the count pulses.

The bistable flip-flop circuit as described to this point will be recognized as a conventional circuit having a single input connection and a pair of output circuits. The circuit is organized so that either one or the other of the two sections A and B conducts in one of its bistable electrical states. The transition between cut-off and conduction of the tubes represents an unstable electrical state of the circuit wherein the cross coupling of the plate voltages of the respective sections to the grids of the opposite sections results in fast triggering from one stable electrical state to the other. This behavior during the transistory period is hastened by capacitors 15 and 16 which shunt the resistors 4 and 8, respectively, in the voltage divider circuits.

The application of a negative count pulse through capacitor 10 to the grids drive both grids negatively. This has no effect upon the non-conducting tube section but initiates cut-off of the conducting tube. The rise in plate voltage of the tube which is being cut off increases the grid voltage of the presently non-conducting tube due to the cross connections, initiating its conduction. The drop in plate voltage of the tube which is beginning to conduct through the coupling afforded by the associated capacitor and resistor, drives the grid of the tube which is being cut off strongly negative, to effect abrupt switching of conduction from one tube to the other. The application of another count pulse to the grids is effective to switch the circuit back to its initial electrical state. Thus, a single pulse is effective with the arrangement described, to switch the circuit between its respective electrical states.

In this embodiment of the invention, the voltage drop appearing across the respective peaking inductors 2 and 6 is utilized to control the common grid circuit of the next higher stage in the counting chain. The voltages of both peaking inductors 2 and 6 are applied to the grid circuits of stage II through respective diodes 18 and 19 which are poled to transmit only the negative voltage swings of the inductors 2 and 6 to the common grid circuit of stage II. As will be observed by reference to the drawing, the external connections of this grid circuit correspond to those illustrated in connection with stage I, including a capacitor 40 which is connected to the common terminals of the negatively poled diodes 41 and 42 in the respective grid circuit $G_A$ and $G_B$ of the twin triode (not illustrated) of stage II. In this grid circuit resistors 45 and 49 correspond to resistors 5 and 9 of the grid circuit of stage I and resistor 44 corresponds to the biasing resistor 14 in stage I. In the plate circuits the peaking inductors 43 and 46 correspond respectively to peaking inductors 2 and 6 in the plate circuits of the twin triode of stage I. In the stage II circuit, the voltages of peaking inductors 43 and 46 are coupled into the single input of the stage III flip-flop circuit by means of the negatively poled inductors 38 and 39 which correspond respectively to diodes 18 and 19 in stage I. Capacitor 50, diodes 51 and 52, resistors 55, 59 and 54 correspond respectively to capacitor 10, diodes 11 and 12 and resistors 5, 9 and 14 in the circuit of stage I. Similarly, peaking inductors 53 and 56 in stage III correspond to inductors 2 and 6 in the circuit of stage I.

In view of the fact that the respective stages are arranged to be controlled by negative voltage swings or pulses, provision is made at the respective inductors to cut off or short the positive voltage swings. This is accomplished by paralleling the respective inductors in stage I with diodes 27 and 28 which are poled to short positive voltage swings at the lower terminals of each. Diodes 47 and 48 of stage II and 57 and 58 of stage III correspond respectively to diodes 27 and 28.

For the purpose of controlling the circuit for counting up or counting down, separate voltage supplies are provided. These are represented in conductors 21 and 22 adapted for energization or selective switching between high and low voltage levels. The high voltage levels of conductors 21 and 22 are of approximately the same magnitude as the B+ voltage. The low voltage levels correspond approximately to the negative voltage swing of the inductors. These conductors, 21 and 22, are respectively connected to the lower ends of inductors 2 and 6, for example, by means of diodes 23 and 24, which are poled to apply an existing direct-current potential on one or the other of conductors 21 and 22 to the inductors. The purpose of this arrangement is to provide a means for selectively applying clamping voltages to the lower ends of these conductors to prevent negative voltage swings even though the connected tube may be conducting. Effectively, this connection, in each case, shorts the inductors associated therewith and effectively transfers the entire voltage change as a result of tube conduction to the respective plate resistors 3 and 7, thus selectively preventing the transmission of negative voltage pulses to the grid circuit of stage II. Diodes 63 and 64 in stage II and 73 and 74 in stage III are similarly connected to the positive voltage conductors 21 and 22 to afford simultaneous control in a corresponding sense of all of the grid control points in the anode circuits of the respective flip-flop stages.

In operation, if the voltage at the plate of either section of a flip-flop stage drops sharply owing to the triggering of the section from a non-conducting state to a conducting state and, in the absence of the polarizing diodes 27 and 28, for example, the inductor circuits would tend to produce a damped oscillatory signal at the lower terminal ends thereof. With the initiation of conduction of a particularly section of a flip-flop, the initial portion of this signal would be negative. However, diodes such as 27 and 28, short or cut off the positive going portion of the oscillatory signal. The net result is the production of a sharp negative pulse. Depending upon which of the A or B sections is conducting, this negative pulse will be transmitted either through a diode 18 or 19, to the grids of the next higher stage. However, if the voltage at the plate of either section of the twin triode 1 should increase sharply with cut-off of that tube section, the resulting positive going signal across the associated peaking coil or inductor is shorted out by the diode. It is thus seen that stage I will apply a triggering pulse to stage II whenever the voltage at one of the plates at triode 1 drops sharply. Similar considerations apply to the behavior of the other two stages as described above.

In practice, provision is made for selectively controlling the voltages applied to conductors 21 and 22, in such a sense that when conductor 21 is at its high voltage level, which is substantially the voltage of the B+ conductor, conductor 22 will be at its low voltage level, which is substantially less than the voltage of the B+ conductor. Thus, the voltage pattern which is applied causes the counter to count up. Under these conditions, as will be described hereinafter, the counter will count up one digit for each count pulse applied to the single input of the counter circuit.

Assume that initially each stage of the counter has its A section conducting and its B section cut off and that this condition represents the binary number "0" in each stage. The first count pulse applied to capacitor 10 triggers stage I rendering its B section conducting and cutting off its A section as previously described. Since the A section has switched from its conducting state to its con-conducting state, no triggering pulse will be produced by coil 6. On the other hand, coil 2 will tend to produce a negative pulse due to conduction of the B section. However, in this case with conductor 21 energized at approximately the same potential as the B+ conductor, the plate voltage supply for the conducting stage is effectively supplied by conductor 21 through diode 23, in effect shorting inductor 2 from the circuit. This effectively clamps the voltage at the lower terminal of coil 2 at approximately the B+ level preventing the occurrence of a negative pulse. Thus switching of stage I from its binary "0" to its binary "1" state is ineffective to transmit a triggering pulse to stage II or any following stages. At this point, the electrical states of the counter stages represent the binary number 001.

The next count pulse applied at the input to the counter chain triggers stage I rendering the A section conducting and cutting off the B section. As the A section goes from its non-conducting to its conducting state, a sharp voltage drop occurs across the coil 6 producing a sharp negative voltage pulse. Since conductor 22 is at its low voltage level, there is no effective voltage clamping action and this pulse is applied through the diode 19 to input capacitor 40 of the common grid circuits of stage II causing this stage to switch from its binary "0" electrical state to its binary "1" electrical state in which the A section is cut off and the B section is conducting. At this time, the production of a negative pulse at the lower terminal of coil 43 is prevented due to the application of positive voltage from conductor 21 to this terminal point, effectively shorting coil 43 from the plate circuit of the B section of stage II. Accordingly no further triggering of the stages of the counter will occur and the three stages of the counter in their present electrical states indicate the binary number 010. It is, therefore, apparent that with conductors 21 and 22 at the described high and low voltage levels, respectively, the counter will count up one binary digit for each pulse which is applied at the single input terminal of the counter circuit.

When the counter is to count down, the voltage levels on conductors 21 and 22 are reversed placing conductor 22 at approximately the voltage level of the B+ supply conductor and placing conductor 21 at a low voltage. This voltage pattern now clamps the voltages at the lower terminal of coils 6, 46 and 56 in the respective counter stages.

The next count pulse triggers stage I rendering the B section conducting and cutting off the A section. This switches counter stage I to its binary "1" electrical state and with conduction of the B section, a sharp negative pulse is produced at the lower terminal of coil 2 which is coupled by diode 18 and capacitor 40 to the common grid circuits of stage II. Stage II at this time is in its binary "1" electrical state with its B section conducting. The application of this pulse switches stage II from its binary "1" electrical state to its binary "0" electrical state in which the A section conducts. In view of the clamping voltage applied from conductor 22 through diode 64 to the lower terminal of coil 46 in the plate of the A section of stage II, no negative triggering pulse is produced. Consequently stage III is unaffected by this change in electrical state in stage II. Thus, the electrical state of the counter circuit indicates the binary number 001. The application of an additional pulse to the single input of the counter circuit reverses the electrical state of stage I, switching it from its binary "1" to its binary "0" electrical state, returning the counter circuit to its binary "0" electrical configuration.

Figure 2:
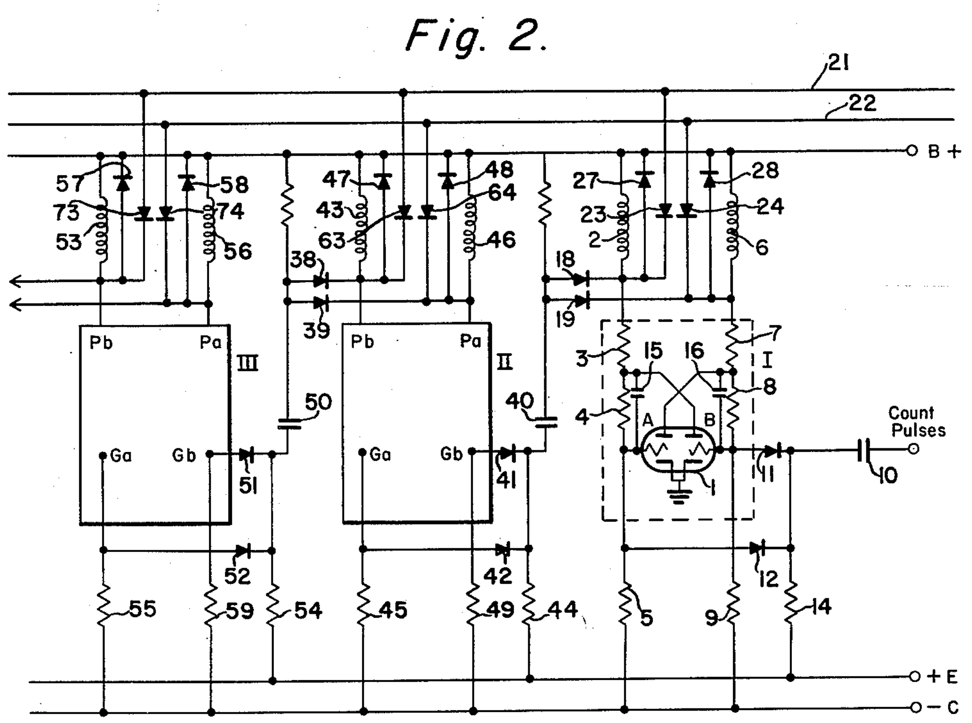
Fig. 2 is a block diagram illustrating an application of the present invention.

Fig. 2 illustrates an application of the counter circuit of Fig. 1 in an analog-to-digital converter system wherein an analog voltage source, the output of which is to be converted to digital form, is represented in block 80. The arrangement herein illustrated, utilizing high speed electronic switching devices, provides a means wherein a digital signal, accurately representative of a rapidly varying analog voltage at any instant of time, may be produced. In accomplishing this, the output of the digital counter 81, which output may be read out in parallel as indicated, is summed in a conventional summation network 82, wherein digital voltages existing at any instant are combined to produce a representative analog voltage. As will be understood from conventional practices, the respective binary digit voltages are weighted in the summation network 82 according to their digit positions, to produce a representative analog voltage at the output of the summation network. This analog voltage representative of the contents of the digital counter is compared with the analog voltage which is to be converted to digital form, in a comparator circuit 83 and the difference of these two voltages is amplified in a conventional direct-current amplifier 84 and applied to the input of a trigger circuit 85. This trigger circuit has two output circuits represented in connections 21 and 22, respectively, which correspond to conductors 21 and 22 of Fig. 1. If the analog voltage representative of the count in the digital counter exceeds the applied analog voltage of source 80, the trigger circuit operates to place conductor 22, the subtract conductor, at its high voltage level and conductor 21, the add conductor, at its low voltage level. Thus, with the application of each pulse to the digital counter 81 from clock pulse source 86 through pulse distributor 87, the digital counter 81 will count down one binary bit per input count pulse until such time as the analog voltage output of the comparator circuit 83 equals and opposes the applied analog voltage therein, which nulls the comparator circuit output tending to stop the operation. As the circuit is arranged, it will be appreciated, the low count will not stop at this point but will tend to oscillate a binary bit below and a binary bit above the null point with switching of the trigger circuit. Provision is made for reading out the contents of the digital counter by means of read out gates 88 of conventional arrangement, herein illustrated in block form. The read out gates are simultaneously controlled by a reading control gate 89 which requires the simultaneous application of a control voltage from a reading control source 90 and the clock pulse from the pulse distributor. The clock pulse from the pulse distributor may be delayed so that reading takes place only during the quiescent state of the digital counter avoiding ambiguities in this respect. Additional details relating to circuit arrangements applicable in connection with the counter circuit herein and additional details with respect to a circuit of the type shown in Fig. 2 herein, may be had by reference to the aforesaid parent application, of which this application is a division.

It will be appreciated that other means may be provided for controlling the application of voltages to conductors 21 and 22 other than that illustrated in Fig. 2. For example, conventional mechanical switching may be utilized to switch the conductors between the two-level voltage states. Such switching would preferably be mechanical interlocked in order to avoid the possibility of simultaneously applying high voltage or low voltage to conductors 21 and 22. Mechanical switching under the control of a perforated tape reader may also be applied in controlling the application of clamping voltages to the counter circuit. For example, there are applications wherein a certain digital program is punched out on a paper tape to be read by a conventional pin type of reader, the reading pins of which control individual electric switches. In such instances, electrical digital information stored or circulated at some other point may be combined with the digital information derived from the tape reader. The manner in which this digital information is to be combined in the counter, that is, added or subtracted, may be programmed in the tape by the presence or absence of perforations controlling selected reading pins. Thus, for example, the presence of a perforation adjacent one of two reading pins used to control the voltages on conductors 21 and 22 may indicate that conductor 21 is to be at its high voltage level while conductor 22 is to be at its low voltage level, or the converse, depending upon the arrangement of the circuits. The electrical connections thus established may be utilized to directly apply the clamping voltages to conductors 21 and 22 or may be utilized through suitable gates or flip-flop circuits to apply the voltages as required. The aforesaid arrangements together with other obvious expedients will be apparent to those skilled in the art.

Although inductors have been herein illustrated in the plate circuits of the various flip-flop stages; it will be appreciated that in certain instances resistors may be substituted. Similarly the specific organization of the counting circuit with regard to the use of negative pulses for triggering purposes both at the single input and at the carry circuits between the respective stages may be changed and the circuit configuration arranged to permit the use of positive pulses. Similarly grid voltage control need not be utilized but conventional cathode bias in both positive and negative senses utilized according to conventional practice.

What is claimed is:

1. An electronic binary counter operable to count up and down in response to one voltage level of count-up and count-down two-level control signals, respectively, said counter comprising: a plurality of binary counting stages, each of said stages producing a signal representing a corresponding binary digit, and including an input circuit and producing first and second two-level output signals; a plurality of count-up carry circuits responsive to said first output signals, respectively, for producing count-up carry signals; a plurality of count-down carry circuits responsive to said second output signals, respectively, to produce count-down carry signals; each of said carry circuits including a diode shunted peaking inductor and being operable in response to said one voltage level of an applied control signal to produce a carry signal when the corresponding applied output signal changes from a first level to a second level; carry control means for applying the count-up and count-down two-level control signal to said count-up and count-down carry circuits, respectively; and circuit means connecting said carry circuits of each binary counting stage to the input circuit of the next higher order binary counting stage.

2. An electronic binary counter comprising: a plurality of bistable elements connected into a binary counting chain, the position of each of the bistable elements in the chain corresponding to a binary place, each of said bistable elements including an input circuit and first and second output circuits producing first and second two-level output signals, respectively; a plurality of first carry circuits coupled to the first output circuits, respectively; a plurality of second carry circuits coupled to the second output circuits, respectively, each of said carry circuits including a diode shunted coil circuit and being operable in response to said one voltage level of an applied signal to produce a carry signal when the signal appearing at the associated output circuit changes from a first level to a second level; carry control means for applying the first and second two-level control signals to said first and second carry circuits, respectively; and circuit means connecting the carry circuits of one bistable element to the input circuit of the next higher order bistable element.

3. An electronic binary counter operable to count up and down in response to one voltage level of first and second two-level control signals, respectively, said counter comprising: a plurality of flip-flops connected into a binary counting chain, the position of each of the flip-flops in the chain corresponding to a binary place, each of said flip-flops including an input circuit and first and second output circuits producing first and second two-level output signals, respectively; a plurality of first carry circuits coupled to the first output circuits, respectively; a plurality of second carry circuits coupled to the second output circuits, respectively; each of said carry circuits having a peaking inductor and a biased diode connected across said inductor for damping oscillation in one direction, said inductor being operable in response to said one voltage level of an applied control signal to produce a carry signal when the signal appearing at the associated output circuit changes from a first level to a second level; carry control means for applying the first and second two-level control signals to said first and second carry circuits, respectively; and circuit means connecting the carry circuits of each flip-flop to the input of the next higher order flip-flop in said counting chain.

4. The counter defined in claim 3 wherein each of said carry control means includes a diode for applying the associated control signal to the corresponding carry circuit, said one voltage level of the associated control signal back biasing the corresponding diode, allowing oscillation in the associated carry circuit, and the other voltage level of said control signal forward biasing the associated diode and squelching any oscillation in the associated carry circuits.

5. An electrical binary counter, comprising: a pair of electrical bistable elements, each having a pair of output circuits and an input circuit; reactive impedance means connected in each output circuit; unidirectional current conducting means connected in parallel with each reactive impedance means, each unidirectional current conducting means being poled in opposition to normal current flow in the associated output circuit; unidirectional current conducting means connecting both output circuits of one bistable element to the input circuit of the other bistable element, to control said other bistable element in dependence on voltage changes of said reactive impedance devices in the respective electrical states of said one bistable element; means for selectively applying clamping voltages to each output circuit of said one bistable element to selectively prevent said voltage changes; and means for applying count pulses to the input circuit of said other bistable element.

6. An electronic binary counter, comprising: a pair of electrical bistable elements, each having a pair of impedance output circuits and an input circuit; circuit means connecting both output circuits of one bistable element to the input circuit of the other bistable element, to control said other bistable element in dependence on voltage changes in said impedance output circuits of said one bistable element; a polarized shunt circuit shunting a selected portion of the impedance in each impedance output circuit of said one bistable element; circuit means for selectively applying clamping voltages to said impedance portions, and circuit means connected to apply count pulses to the input circuit of said one bistable element.

7. An electrical binary counter, comprising: a first electrical bistable element having a pair of output circuits and an input circuit; a rectifier shunted coil connected in each of said output circuits, a second electrical bistable element having a pair of output circuits and having an input circuit connected to each of said coils, to be controlled by the voltage of both of said coils; means connected to apply count pulses to said input circuit of said first bistable element; and circuit means connected to selectively apply clamping voltages to said coils to selectively substantially prevent coil voltage changes.

References Cited in the file of this patent

UNITED STATES PATENTS

| | | |
|---|---|---|
| 2,722,601 | Piel | Nov. 1, 1955 |
| 2,735,005 | Steele | Feb. 14, 1956 |
| 2,782,305 | Havens et al. | Feb. 19, 1957 |